US008870241B2

(12) United States Patent
Lee et al.

(10) Patent No.: US 8,870,241 B2
(45) Date of Patent: Oct. 28, 2014

(54) OPENING AND CLOSING DEVICE FOR FUEL DOOR OF VEHICLE

(75) Inventors: Sang Hyun Lee, Jeju-si (KR); Jae Hoon Choi, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 288 days.

(21) Appl. No.: 13/303,958

(22) Filed: Nov. 23, 2011

(65) Prior Publication Data

US 2012/0313382 A1 Dec. 13, 2012

(30) Foreign Application Priority Data

Jun. 13, 2011 (KR) ........................ 10-2011-0056635

(51) Int. Cl.

| | |
|---|---|
| ***E05C 1/06*** | (2006.01) |
| ***E05B 83/34*** | (2014.01) |
| ***E05B 81/34*** | (2014.01) |
| ***E05B 81/28*** | (2014.01) |
| ***E05B 81/06*** | (2014.01) |
| *E05F 11/00* | (2006.01) |
| *B62D 25/00* | (2006.01) |

(52) U.S. Cl.

CPC ................. *E05B 81/06* (2013.01); *E05B 83/34* (2013.01); *E05B 81/34* (2013.01); *E05B 81/28* (2013.01)

USPC ........................... 292/144; 49/325; 296/97.22

(58) Field of Classification Search

USPC ......... 292/138, 144, 199, 195, 279, 280, 201, 292/39, 160, 142, 146, DIG. 4, DIG. 12, 292/DIG. 17, DIG. 34, DIG. 37; 296/97.22; 49/394, 325

See application file for complete search history.

(56) References Cited

U.S. PATENT DOCUMENTS

| | | | | |
|---|---|---|---|---|
| 323,998 | A * | 8/1885 | Baringer | 292/39 |
| 4,921,288 | A * | 5/1990 | Cifuentes et al. | 292/114 |
| 5,553,351 | A * | 9/1996 | Starks | 16/223 |
| 6,062,612 | A * | 5/2000 | Lin | 292/144 |
| 6,318,196 | B1 * | 11/2001 | Chang | 74/89.12 |
| 8,677,690 | B2 * | 3/2014 | Lee et al. | 49/325 |
| 2002/0084656 | A1 * | 7/2002 | Lin | 292/160 |
| 2005/0218662 | A1 * | 10/2005 | Umino | 292/216 |

* cited by examiner

*Primary Examiner* — Kristina Fulton
*Assistant Examiner* — Faria Ahmad
(74) *Attorney, Agent, or Firm* — Morgan, Lewis & Bockius LLP

(57) ABSTRACT

An opening and closing device for a fuel door of a vehicle including a push type latch device for locking or unlocking the fuel door that may be rotatably mounted to a side of a housing by a hinge unit, may include a locking rod movable by an actuator and selectively locked to a locking slot provided in the hinge unit to which the fuel door may be attached, thereby controlling rotation of the hinge unit, and an anti-thrust lever operated in conjunction with the locking rod actuated by the actuator to selectively support the fuel door so as to prevent the fuel door from being thrust backwards.

4 Claims, 6 Drawing Sheets

OPENING AND CLOSING DEVICE FOR FUEL DOOR OF VEHICLE

CROSS-REFERENCE TO RELATED APPLICATIONS

The present application claims priority to Korean Patent Application No. 10-2011-0056635 filed on Jun. 13, 2011, the entire contents of which is incorporated herein for purposes by this reference.

BACKGROUND OF THE INVENTION

1. Field of the Invention

The present invention relates to an opening and closing device for a fuel door of a vehicle, which has improved operational reliability.

2. Description of Related Art

A vehicle body is provided with a fuel filler neck for filling a fuel tank with fuel at the outside of the vehicle body and the fuel filler neck is opened and closed by a fuel door openably attached to the vehicle body using a hinge.

The fuel door of a vehicle is typically made of steel or plastic and is provided with a locking structure, which can easily open the fuel door in response to the simple manipulation of a button by a driver and can maintain the fuel door in a closed state when a person manually pushes the fuel door after filling with fuel has been completed.

In the related art, a locking structure for the fuel door using a push type latch structure has been proposed and used. However, the locking structure using the push type latch structure is problematic in that, even when the fuel door is pushed in a state in which the fuel door is closed and locked, the latch structure may operate and may misoperate.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an opening and closing device for the fuel door of a vehicle, which uses a push type latch structure in a side thereof and has improved operational reliability.

In an aspect of the present invention, an opening and closing device for a fuel door of a vehicle including a push type latch device for locking or unlocking the fuel door that is rotatably mounted to a side of a housing by a hinge unit, may include a locking rod movable by an actuator and selectively locked to a locking slot provided in the hinge unit to which the fuel door is attached, thereby controlling rotation of the hinge unit, and an anti-thrust lever operated in conjunction with the locking rod actuated by the actuator to selectively support the fuel door so as to prevent the fuel door from being thrust backwards.

The actuator may include a drive motor, a pinion gear mounted to an output shaft of the drive motor, a first gear engaged with the pinion gear, and a second gear extending from a center of the first gear and rotated in conjunction with the first gear, wherein the locking rod may include a rod rack gear engaged with the second gear.

The anti-thrust lever may include a lever rack gear engaged with the second gear, and a door support extending from the lever rack gear to a location adjacent to the latch device and supporting a rear surface of the fuel door when the locking rod is locked into the locking slot.

The opening and closing device for the fuel door of the vehicle may further include a guide unit for guiding movement of the anti-thrust lever in forward and backward directions.

The guide unit may include a guide rib formed in a sliding slot of the anti-thrust lever, and a guide member provided in the housing and including a guide groove to which that the guide rib is slidably coupled.

The locking slot is provided in a bottom thereof with a drain hole for draining water from the locking slot.

As described above, the opening and closing device for the fuel door of the vehicle according to the embodiment of the present invention is advantageous in that it can prevent the push type latch device from working improperly and, thereby, has improved operational reliability.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
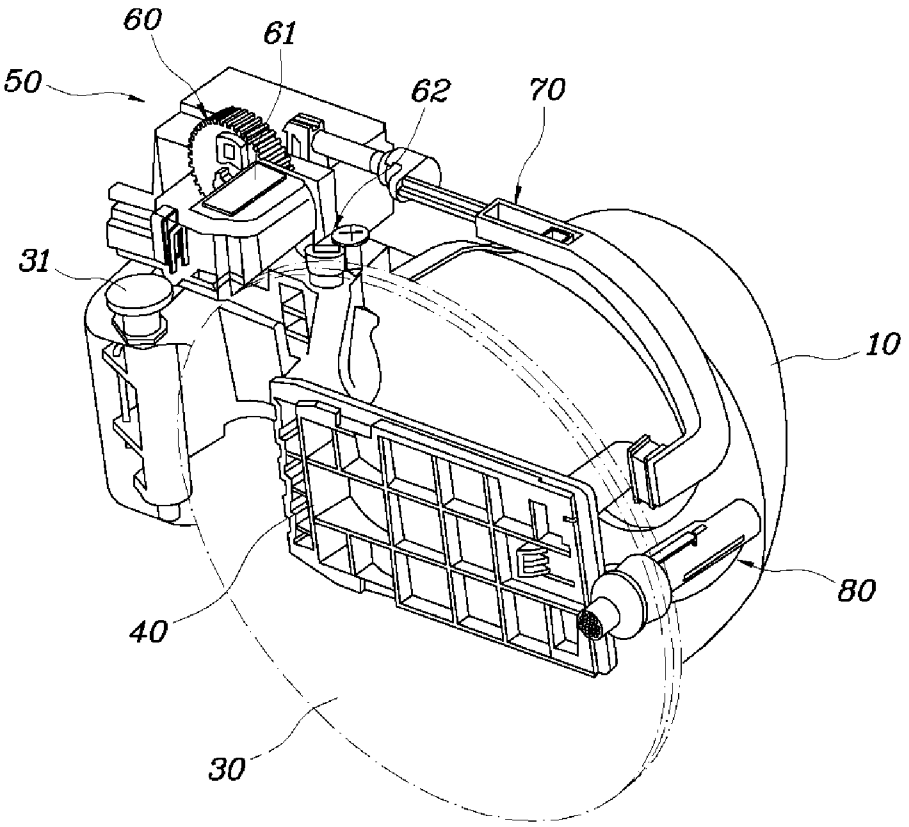
FIG. 1 is a perspective view illustrating an opening and closing device for a fuel door of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, an opening and closing device for a fuel door of a vehicle according to an embodiment of the present invention will be described.

Figure 2:
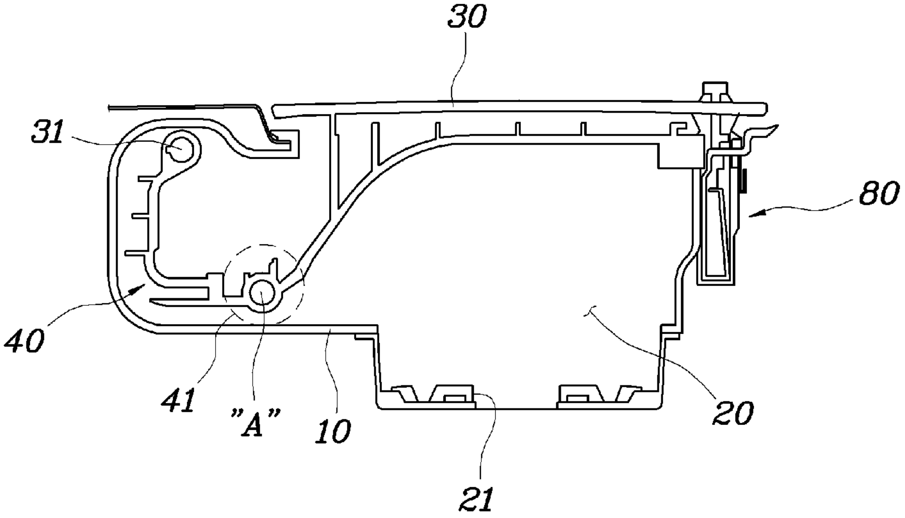
FIG. 2 is a sectional view illustrating a part of the opening and closing device for the fuel door of the vehicle according to the exemplary embodiment of the present invention.
Figure 3:
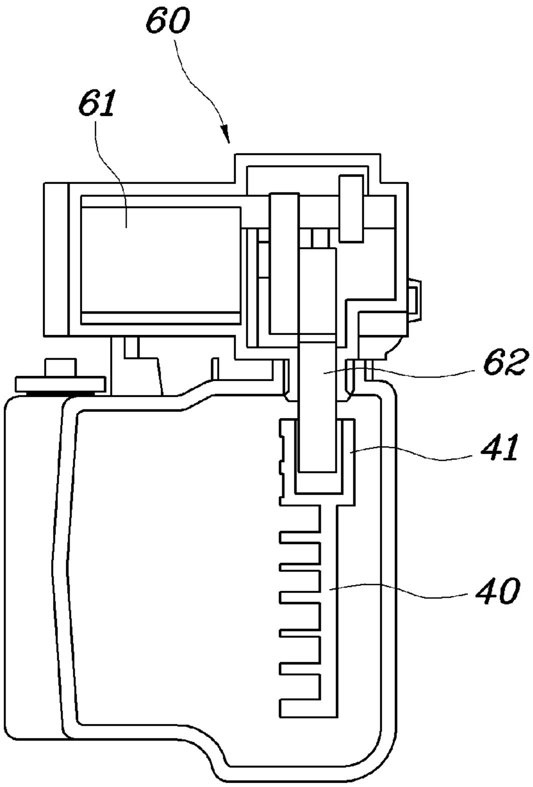
FIG. 3 is a view illustrating portion A of FIG. 2.
Figure 4:
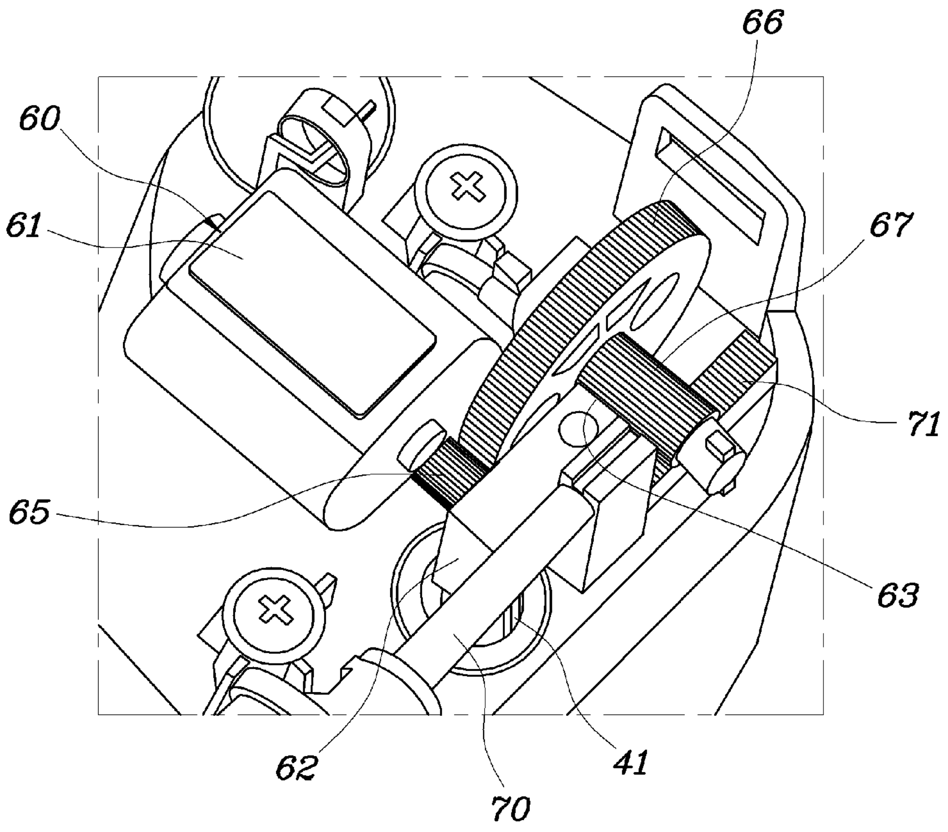
FIG. 4 is a perspective view illustrating an actuator part according to the exemplary embodiment of the present invention.

FIG. 1 is a perspective view illustrating the opening and closing device for the fuel door of the vehicle according to the exemplary embodiment of the present invention. FIG. 2 is a sectional view illustrating a part of the opening and closing device for the fuel door of the vehicle according to the exemplary embodiment of the present invention. FIG. 3 is a view illustrating portion A of FIG. 2. FIG. 4 is a perspective view illustrating an actuator part according to the exemplary embodiment of the present invention.

As shown in FIG. 1 through FIG. 4, a vehicle body is provided with a fuel filler chamber 20 having a predetermined shape, a fuel filler neck 21 provided inside the fuel filler chamber 20 and connected to a fuel tank and which is for filling the fuel tank with fuel, and a fuel cap provided on the fuel filler neck 21 for opening or closing the fuel filler neck 21.

The fuel filler chamber 20 is defined by a housing 10 provided in the vehicle body. The housing 10 is open in one side thereof and the open side of the housing 10 is opened and closed by a fuel door 30 openably attached to the housing 10.

The fuel door 30 is mounted to a hinge unit 40, which is rotatably mounted to a side of the housing 10 in such a way that the fuel door 30 can be rotated around the hinge shaft 31. Due to the hinge unit 40, the fuel door 30 can be rotated to open and close the opening of the housing 10.

The hinge unit 40 is configured in the form of a goose neck type unit. The goose neck type hinge unit 40 may be preferably used in a vehicle body that has a severely irregular shape and, accordingly, the hinge shaft may not be located in the fuel door 30.

Further, the fuel door 30 is configured to allow an opening and closing device 50 to open or close the opening of the housing 10.

The opening and closing device 50 includes an actuator 60, which has a locking rod 62 for controlling the rotation of the hinge unit 40, and an anti-thrust lever 70 which is operated in conjunction with a locking rod 62 actuated by the actuator 60.

The actuator 60 is placed in an upper portion of the opening and closing device at a location adjacent to the hinge shaft 31 and includes a drive motor 61 and a plurality of gears driven by the drive motor 61.

The locking rod 62 functions to be inserted into and retracted from a locking slot 41 provided in the hinge unit 40, thereby controlling the rotation of the hinge unit 40.

The plurality of gears include a first gear 66, which is engaged with a pinion gear 65 mounted to the output shaft of the drive motor 61, and a second gear 67, which extends from the center of the first gear 66 and is rotated in conjunction with the first gear 66.

The locking rod 62 includes a rod rack gear 63 which is engaged with the second gear 67, so that the locking rod 62 can be moved upwards and downwards in response to the rotation of the second gear 67, thereby being locked to or unlocked from the locking slot 41.

The anti-thrust lever 70 is provided at a first end thereof with a lever rack gear 71 which is engaged with the second gear 67, and is provided at a second end thereof with a door support 73, which extends from the lever rack gear 71 to a location adjacent to a push type latch device 80 and supports the rear surface of the fuel door 30.

Figure 5:
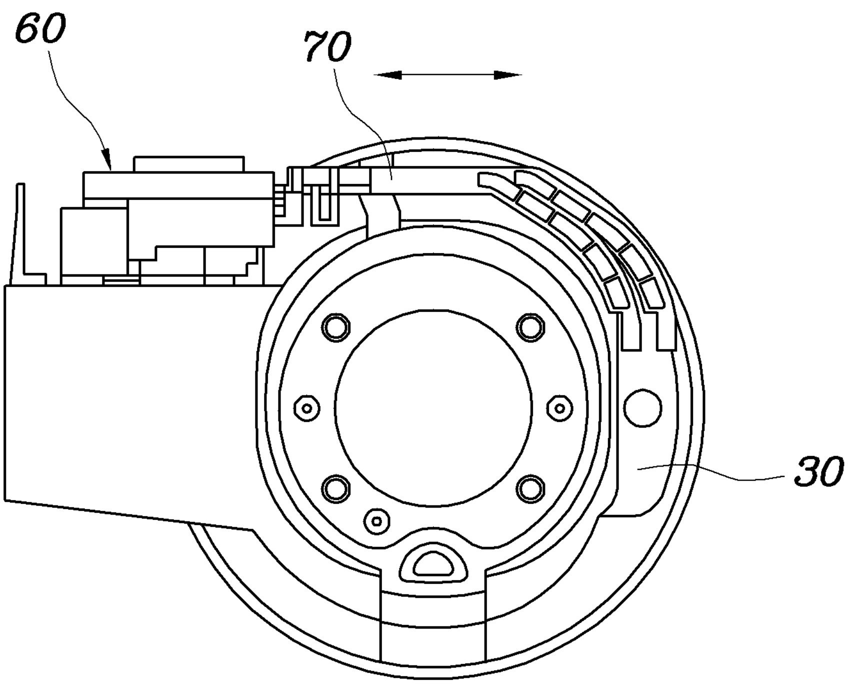
FIG. 5 and FIG. 6 are views illustrating the operation of an anti-thrust lever according to the exemplary embodiment of the present invention.
Figure 6:
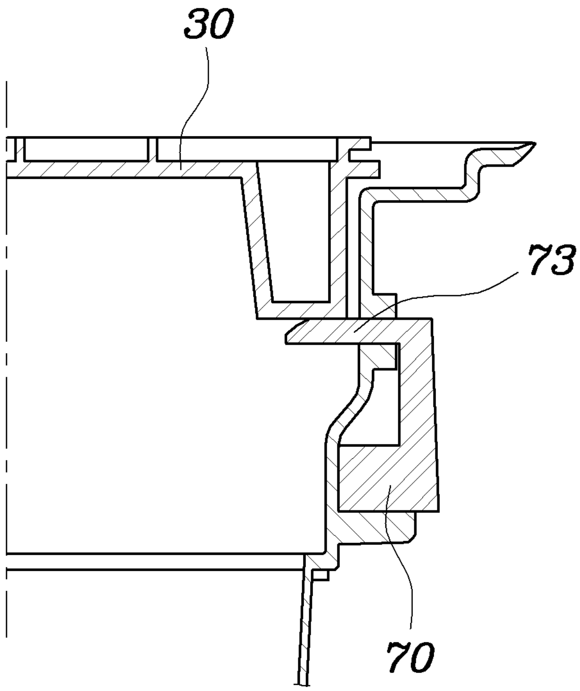

As shown in FIG. 5 and FIG. 6, when the second gear 67 is rotated, the anti-thrust lever 70 is moved in a direction crossing the width direction of the fuel door 30, so that the door support 73 can be brought into contact with or can be spaced apart from the rear surface of the fuel door 30. Therefore, when the fuel door 30 is being locked by the locking rod 62, the anti-thrust lever can prevent the fuel door 30 from being thrust backwards. However, when the fuel door 30 is unlocked from the locking rod 62, the anti-thrust lever does not interfere with the fuel door 30 which is being thrust backwards.

Therefore, when the fuel door 30 having the push type latch device 80 is being locked, the fuel door 30 can be prevented from being thrust backwards, so that it is possible to prevent the fuel door 30 from operating improperly.

Figure 7:
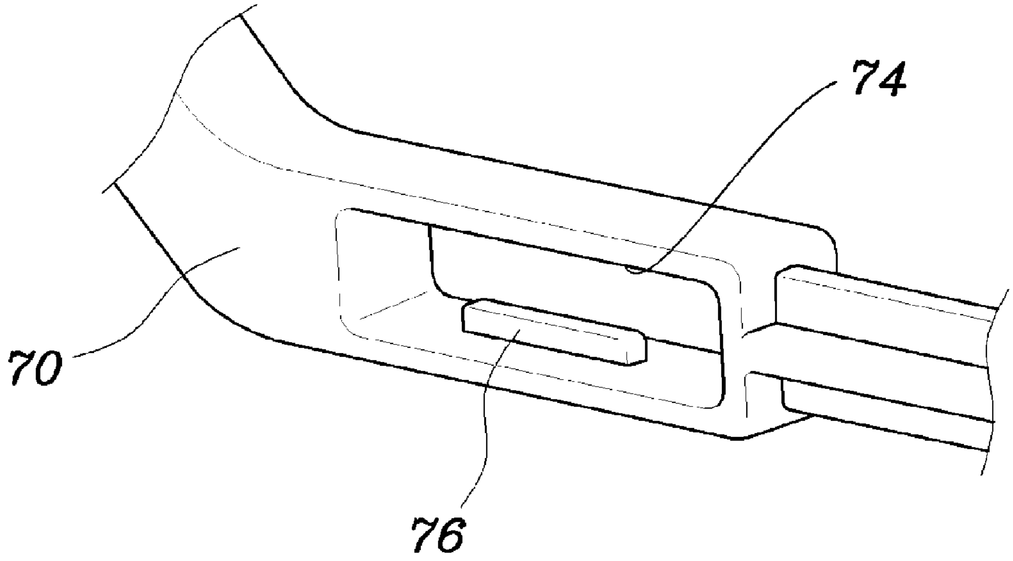
FIG. 7 and FIG. 8 are views illustrating a guide unit of the anti-thrust lever according to the exemplary embodiment of the present invention.

Further, as shown in FIG. 6 and FIG. 7, the anti-thrust lever 70 is provided with a guide unit 75 for preventing the anti-thrust lever 70 from being moved in undesired directions when the lever 70 is moved forwards and backwards by the actuator 60.

The guide unit 75 includes a guide rib 76 formed in a sliding slot 74 of the anti-thrust lever 70 and a guide member 77 which is fixedly provided in the housing 10 and is movably engaged with the guide rib 76. The guide member 77 includes a guide groove 78 such that the guide rib 76 is slidable coupled thereto.

When the anti-thrust lever 70 is moved in the width direction of the fuel door 30 by the actuator 60, the guide unit 75 prevents the anti-thrust lever 70 from being moved in directions other than the width direction of the fuel door.

Figure 8:
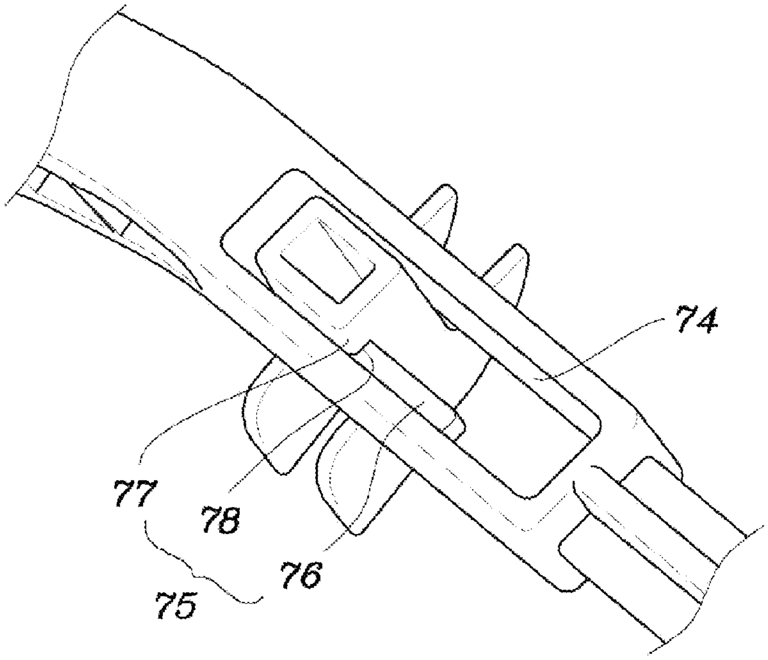
Figure 9:
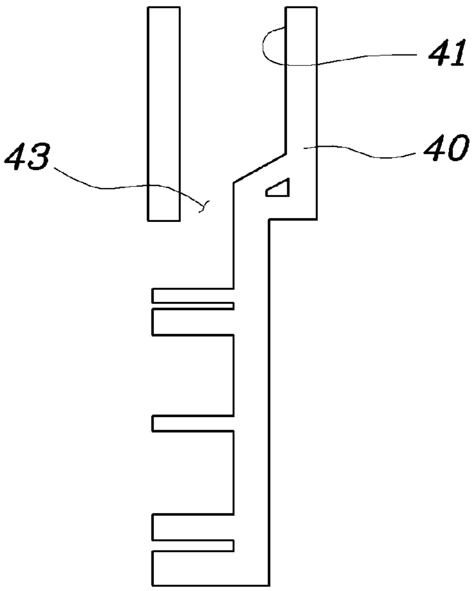
FIG. 9 is a sectional view illustrating a drain structure of a locking slot according to the exemplary embodiment of the present invention.

As shown in FIG. 8, in order to allow the locking rod 62 to be inserted into and retracted from the locking slot 41, the locking slot 41 of the hinge unit 40 is open in the upper part thereof, so that water may be introduced into the locking slot 41 and may be collected therein, which would prevent the locking rod 62 from operating. In order to solve the problem, the bottom of the locking slot 41, into which the locking rod 62 is inserted, is provided with a drain hole 43 for draining water from the locking slot 41.

The locking slot 41 has a length corresponding to a stroke of the locking rod 62 so as to realize a hinge unit 40 of the desired strength. Further, the opening direction of the drain hole 43 is opposed to a user's manipulating direction for the fuel door, thereby realizing a fuel door of good appearance.

For convenience in explanation and accurate definition in the appended claims, the terms "upper", "lower", "inner," "outer", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An opening and closing device for a fuel door of a vehicle comprising:

a hinged unit rotatably mounting the fuel door to a first side of a fuel filler housing of the vehicle, the hinged unit including a locking slot;

a push latch device for opening and closing the fuel door, the push latch device being disposed at a second side of the fuel filler housing;

a locking rod movable between locked and unlocked positions by an actuator, wherein the locking rod selectively engages the locking slot of the hinged unit to which the fuel door is attached, thereby locking rotation of the hinged unit when the locking rod is in the locked position; and an anti-thrust lever linearly moveable in conjunction with the locking rod, wherein the anti-thrust lever prevents the fuel door from rotating backwards when the locking rod is in the locked position and allows the fuel door to rotate backwards when the locking rod is in the unlocked position;

wherein the actuator includes:

a drive motor;

a pinion gear mounted to an output shaft of the drive motor;

a first gear engaged with the pinion gear; and a second gear extending from a center of the first gear and rotated in conjunction with the first gear;

wherein the locking rod includes a rod rack gear engaged with the second gear; and wherein the anti-thrust lever includes:

a lever rack gear engaged with the second gear at a first end of the anti-thrust lever; and a door support extending from a second end of the anti-thrust lever adjacent to the push latch device and supporting a rear surface of the fuel door when the locking rod is in the locked position.

2. The opening and closing device for the fuel door of the vehicle as set forth in claim 1, further including:

a guide unit for guiding movement of the anti-thrust lever in forward and backward directions.

3. The opening and closing device for the fuel door of the vehicle as set forth in claim 2, wherein the guide unit includes:

a guide rib formed in a sliding slot of the anti-thrust lever; and a guide member provided in the housing and including a guide groove to which the guide rib is slidably coupled.

4. The opening and closing device for the fuel door of the vehicle as set forth in claim 2, wherein the locking slot is provided in a bottom thereof with a drain hole for draining water from the locking slot.

* * * * *